United States Patent [19]

Muramatsu et al.

[11] Patent Number: 5,675,564
[45] Date of Patent: Oct. 7, 1997

[54] INFORMATION REPRODUCING APPARATUS FOR OPTICAL DISC HAVING A TILT DETECTOR THEREIN

[75] Inventors: Eiji Muramatsu; Akiyoshi Inoue; Shoji Taniguchi, all of Tokorozawa, Japan

[73] Assignee: Pioneer Electronic Corporation, Tokyo-to, Japan

[21] Appl. No.: 595,073

[22] Filed: Feb. 1, 1996

[30] Foreign Application Priority Data

Feb. 2, 1995 [JP] Japan ............... 7-016298

[51] Int. Cl.$^6$ ............................................... G11B 7/00
[52] U.S. Cl. ............................... 369/54; 369/124
[58] Field of Search ................... 369/44.23, 44.37, 369/44.32, 54, 124

[56] References Cited

U.S. PATENT DOCUMENTS

| | | | |
|---|---|---|---|
| 5,216,649 | 6/1993 | Koike et al. | 369/44.32 |
| 5,430,700 | 7/1995 | Kuribayashi et al. | 369/44.37 |
| 5,442,615 | 8/1995 | Ohsato et al. | 369/44.32 |

Primary Examiner—Thang V. Tran
Attorney, Agent, or Firm—Kane,Dalsimer, Sullivan, Kurucz, Levy, Eisele and Richard, LLP

[57] ABSTRACT

An information reproducing apparatus for reproducing information recorded on an information track formed on an information record surface of an optical disc, is provided with: a light irradiation device for irradiating the information record surface with a plurality of light beams including a first light beam, to which a coma aberration is not given, and at least one second light beam, to which a predetermined coma aberration for cancelling a coma aberration due to a tilt of the information record surface in a direction perpendicular to the information track is given, such that the first light beam and the second light beam form light spots arranged along the information track; a first photo-detector for detecting a first reflection light from the information record surface and generating a first light detection signal; a second photo-detector for detecting a second reflection light from the information record surface and generating a second light detection signal; a tilt detection device for detecting a tilt of the information record surface and outputting a tilt signal; and a selection device for selecting one of the first and second light detection signals which has a less coma aberration according to the tilt signal. The information is reproduced on the basis of the selected one of the first and second light detection signals.

10 Claims, 11 Drawing Sheets

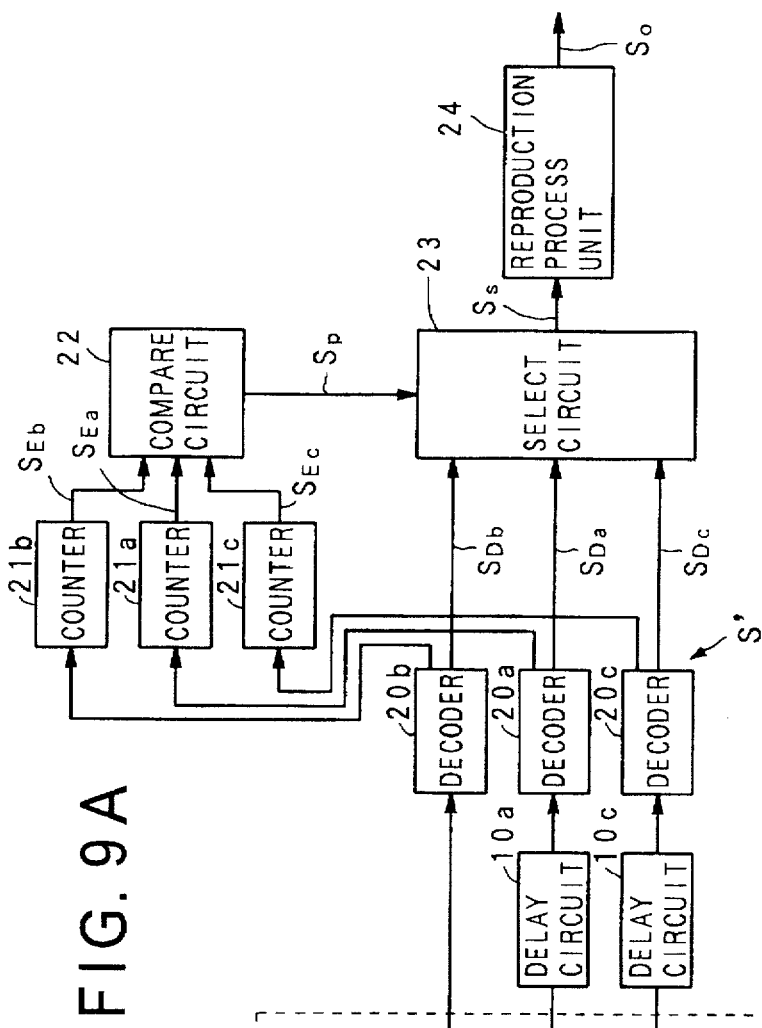
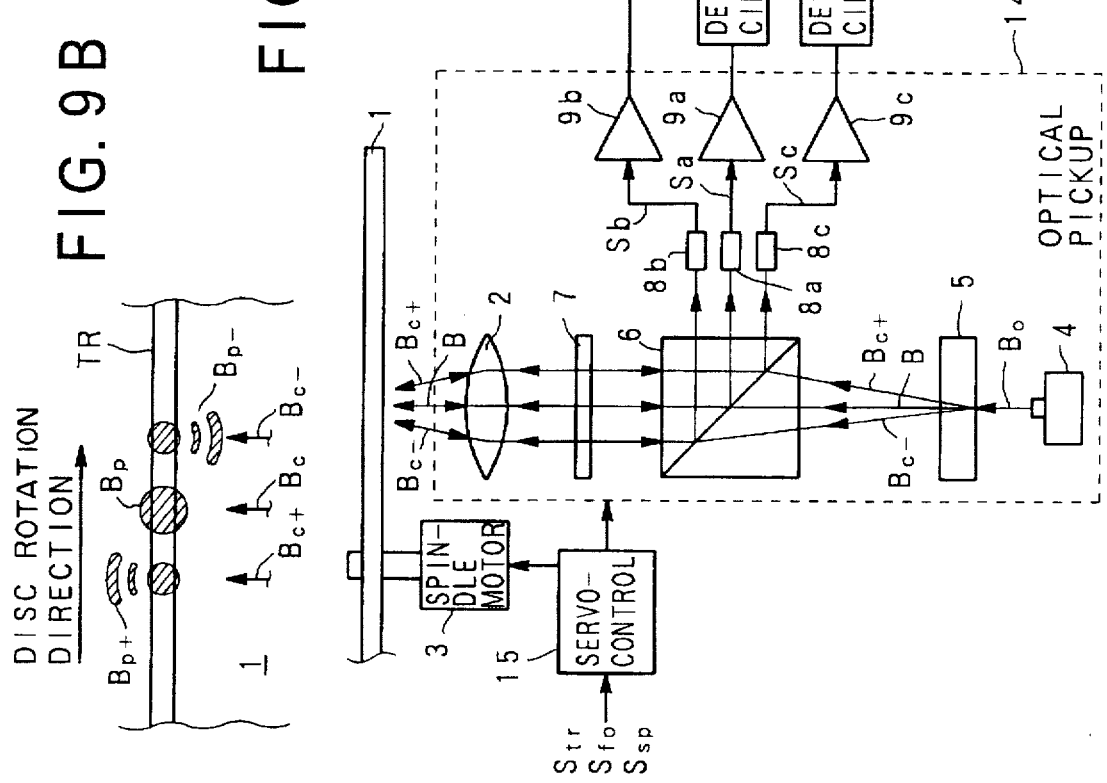

INFORMATION REPRODUCING APPARATUS FOR OPTICAL DISC HAVING A TILT DETECTOR THEREIN

BACKGROUND OF THE INVENTION

1. Field of the Invention

The present invention generally relates to an information reproducing apparatus for optically reproducing an optical disc such as a CD (Compact Disc) player, a LD (Laser Disc) player, a DVD (Digital Video Disc) player etc.

2. Description of the Related Art

In the operation of an information reproducing apparatus of this type, an optical disc such as a CD, a LD, a DVD etc., is held at a center thereof by a clamper etc. and is rotated around the center by a spindle motor. Then, a light beam is emitted from a light emitting element of an optical pickup and is applied onto the rotated optical disc, while the reflection light of the light beam reflected from the information record surface of the optical disc is received by the photo-detector of the optical pickup, so that the recorded information is reproduced on the basis of the received reflection light.

In order to perform a correct reproduction process, the information record surface of the optical disc is positioned perpendicular to the optical axis of the light beam during this reproduction process. If this perpendicular relationship between the information record surface and the optical axis is lost, the light beam is applied onto the information record surface obliquely. Thus, the irradiation area of the light beam on the information record surface is expanded, so that the irradiation area on the information record surface may cover not only the target information track recorded with the information to be reproduced but also the adjacent information track, which is adjacent to the target information track. Consequently, the information on the adjacent information track may be simultaneously reproduced as the cross talk with respect to the information to be reproduced.

The optical disc comprises resin material in general. Thus, the optical disc tends to be distorted by its aged deterioration and by the stress applied by the clamper when clamping it. The degree of this distortion is increased toward the outer circumference of the optical disc. Accordingly, the angular relationship between the information record surface and the optical axis of the light beam is offset from the right angle. This tilt of the information record surface relative to the optical axis of the light beam is called as a "disc skew". As a result, in the actual case of the reproduction operation, the cross talk is generated by the disc skew.

In order to reduce the disc skew, a tilt sensor may be provided which detects the tilt angle of the information record surface due to the distortion of the optical disc, and the central axis of the optical pickup may be mechanically tilted in accordance with the detected tilt angle such that the angular relationship between the information record surface and the optical axis of the light beam be perpendicular.

A construction of such a tilt sensor is disclosed in Japanese Utility Model Application Laid Open Sho. 60-123,763 (Japanese Utility Model Sho. 64-2265), for example. In this publication, a detection light beam, which is different from the reproduction light beam i.e. which is exclusive for detecting the tile angle, is applied onto the information record surface, and the reflection light of the detection light beam is detected by a plurality of photo-detectors arranged in the radial direction and spaced from each other so that the tilt angle is obtained by the difference in the light intensities of the reflection lights detected by the photo-detectors.

However, in the above explained information reproducing apparatus, since the optical pickup is mechanically tilted in order to compensate the disc skew, there must be a mechanical movable element such as a driving mechanism etc., resulting in that the size and the production cost of the apparatus are inevitably increased, which is the serious problem in the practical case.

SUMMARY OF THE INVENTION

It is therefore an object of the present invention to provide an information reproducing apparatus which can compensate the disc skew by use of a relatively simple construction.

The above object of the present invention can be achieved by a first information reproducing apparatus for reproducing information recorded on an information track formed on an information record surface of an optical disc. The first information reproducing apparatus is provided with: a light irradiation device for irradiating the information record surface with a plurality of light beams including a first light beam, to which a coma aberration is not given, and at least one second light beam, to which a predetermined coma aberration for cancelling a coma aberration due to a tilt of the information record surface in a direction perpendicular to the information track is given, such that the first light beam and the second light beam form light spots arranged along the information track; a first photo-detector for detecting a first reflection light of the first light beam reflected from the information record surface and generating a first light detection signal indicating the detected first reflection light; a second photo-detector for detecting a second reflection light of the second light beam reflected from the information record surface and generating a second light detection signal indicating the detected second reflection light; a tilt detection device for detecting a tilt of the information record surface at an area irradiated with the first and second light beams and outputting a tilt signal indicating the detected tilt; a selection device for selecting one of the first and second light detection signals which has a less coma aberration according to the tilt signal; and a reproduction process device for reproducing the information on the basis of the selected one of the first and second light detection signals.

According to the first information reproducing apparatus, the light irradiation device irradiates the information record surface with the first light beam and the second light beam such that the first light beam and the second light beam form light spots arranged along the information track. At this time, the predetermined coma aberration for cancelling a coma aberration due to a tilt of the information record surface in a direction perpendicular to the information track is given to the second light beam by the light irradiation device. Then, the first reflection light is detected by the first photo-detector and the first light detection signal is generated, while the second reflection light is detected by the second photo-detector and the second light detection signal is generated. The tilt of the information record surface at an area irradiated with the first and second light beams is detected by the tilt detection device, and the tilt signal is generated. Then, one of the first and second light detection signals which has a less coma aberration is selected by the selection device according to the tilt signal. Finally, the information is reproduced by the information reproducing device on the basis of the selected one of the first and second light detection signals.

Accordingly, depending on the tilt condition of the information record surface, one of the first and second light detection signals can be selected which is less influenced by the tilt of the information record surface. Namely, if there exists no or little tilt, the first light detection signal is selected since the coma aberration is not generated due to the tilt and since the first light beam does not have the coma aberration. In this case, it is enough to use the first light beam as it is without the necessity of cancelling the influence of the coma aberration. On the other hand, if there exists the tilt, the second light detection signal is selected since the coma aberration is certainly generated due to the tilt and since the second light beam has the predetermined coma aberration. In this case, the coma aberration due to the tilt can be cancelled or reduced by the predetermined coma aberration of the second light beam. Thus, even if there exists the tilt which badly influences the first light beam, the influence of the tilt can be compensated by the predetermined coma aberration of the second light beam, so that the correct reproduction process can be performed on the basis of the second light detection signal. Consequently, regardless of the tilt condition, the correct reproduction process can be performed by the first information reproducing apparatus of the present invention.

The above object of the present invention can be also achieved by a second information reproducing apparatus for reproducing information recorded on an information track formed on an information record surface of an optical disc. The second information reproducing apparatus is provided with: a light irradiation device for irradiating the information record surface with a plurality of light beams including a first light beam, to which a coma aberration is not given, and at least one second light beam, to which a predetermined coma aberration for cancelling a coma aberration due to a tilt of the information record surface in a direction perpendicular to the information track is given, such that the first light beam and the second light beam form light spots arranged along the information track; a first photo-detector for detecting a first reflection light of the first light beam reflected from the information record surface and generating a first light detection signal indicating the detected first reflection light; a second photo-detector for detecting a second reflection light of the second light beam reflected from the information record surface and generating a second light detection signal indicating the detected second reflection light; a decoding device for decoding the first and second light detection signals; an error rate detection device for detecting error rates of the first and second light detection signals when decoded by the decoding device; a selection device for selecting one of the decoded first and second light detection signals which has a lower error rate according to the detected error rates; and a reproduction process device for reproducing the information on the basis of the selected one of the decoded first and second light detection signals.

According to the second information reproducing apparatus, the light irradiation device irradiates the information record surface with the first light beam and the second light beam such that the first light beam and the second light beam form light spots arranged along the information track. At this time, the predetermined coma aberration for cancelling a coma aberration due to a tilt of the information record surface in a direction perpendicular to the information track is given to the second light beam by the light irradiation device. Then, the first reflection light is detected by the first photo-detector and the first light detection signal is generated, while the second reflection light is detected by the second photo-detector and the second light detection signal is generated. Then, the first and second light detection signals are decoded by the decoding device while the error rates of the first and second light detection signals when decoded by the decoding device are detected by the error rate detection device. Then, one of the decoded first and second light detection signals which has a lower error rate is selected by the selection device according to the detected error rates. Finally, the information is reproduced by the information reproducing device on the basis of the selected one of the decoded first and second light detection signals.

Accordingly, depending on the reading error which is dependent on the tilt condition of the information record surface, one of the first and second light detection signals can be selected which is less influenced by the tilt of the information record surface. Thus, even if there exists the tilt which badly influences the first light beam, the influence of the tilt can be compensated by the predetermined coma aberration of the second light beam, so that the correct reproduction process can be performed on the basis of the second light detection signal. Consequently, regardless of the tilt condition, the correct reproduction process can be performed by the second information reproducing apparatus of the present invention.

In one aspect of the first and second information reproducing apparatuses of the present invention, the light irradiation device gives the predetermined coma aberration, which is directed perpendicular to the information track on the information record surface, to the second light beam. Thus, the influence of the tilt of the information record surface in the direction perpendicular to the information track can be certainly compensated by virtue of the predetermined coma aberration given to the second light beam.

In another aspect of the first and second information reproducing apparatuses of the present invention, the light irradiation device irradiates the information record surface with two second light beams, to one of which the predetermined coma aberration in one direction perpendicular to the information track on the information record surface is given, and to the other of which the predetermined coma aberration in a direction opposite to the one direction on the information record surface is given. Thus, the influence of the tilt in a wide range can be compensated by use of two second light beams.

The above object of the present invention can be also achieved by a third information reproducing apparatus for reproducing information recorded on an information track formed on an information record surface of an optical disc. The third information reproducing apparatus is provided with: a light irradiation device for irradiating the information record surface with a plurality of light beams including a first light beam, to which a comma aberration is not given and which is applied onto the information record surface perpendicularly, and at least one second light beam, to which a comma aberration is not given and which is applied onto the information record surface obliquely in a direction perpendicular to the information track by a predetermined tilt angle, such that the first light beam and the second light beam form light spots arranged along the information track; a first photo-detector for detecting a first reflection light of the first light beam reflected from the information record surface and generating a first light detection signal indicating the detected first reflection light; a second photo-detector for detecting a second reflection light of the second light beam reflected from the information record surface and generating a second light detection signal indicating the detected second reflection light; a tilt detection device for detecting a tilt of the information record surface at an area irradiated with the first and second light beams and outputting a tilt signal indicating the detected tilt; a selection device for selecting one of the first and second light detection signals which has a less coma aberration according to the tilt signal; and a reproduction process device for reproducing the information on the basis of the selected one of the first and second light detection signals.

According to the third information reproducing apparatus, the light irradiation device irradiates the information record surface with the first light beam and the second light beam such that the first light beam and the second light beam form light spots arranged along the information track. At this time, the first light beam is applied onto the information record surface perpendicularly, and the second light beam is applied onto the information record surface obliquely in a direction perpendicular to the information track by a predetermined tilt angle. Then, the first reflection light is detected by the first photo-detector and the first light detection signal is generated, while the second reflection light is detected by the second photo-detector and the second light detection signal is generated. The tilt of the information record surface at an area irradiated with the first and second light beams is detected by the tilt detection device, and the tilt signal is generated. Then, one of the first and second light detection signals which has a less coma aberration is selected by the selection device according to the tilt signal. Finally, the information is reproduced by the information reproducing device on the basis of the selected one of the first and second light detection signals.

Accordingly, depending on the tilt condition of the information record surface, one of the first and second light detection signals can be selected which is less influenced by the tilt of the information record surface. Thus, even if there exists the tilt which badly influences the first light beam, the influence of the tilt can be compensated by the predetermined tile angle of the second light beam, so that the correct reproduction process can be performed on the basis of the second light detection signal. Consequently, regardless of the tilt condition, the correct reproduction process can be performed by the first information reproducing apparatus of the present invention.

The above object of the present invention can be also achieved by a fourth information reproducing apparatus for reproducing information recorded on an information track formed on an information record surface of an optical disc. The fourth information reproducing apparatus is provided with: a light irradiation device for irradiating the information record surface with a plurality of light beams including a first light beam, to which a comma aberration is not given and which is applied onto the information record surface perpendicularly, and at least one second light beam, to which a comma aberration is not given and which is applied onto the information record surface obliquely by a predetermined tilt angle in a direction perpendicular to the information track, such that the first light beam and the second light beam form light spots arranged along the information track; a first photo-detector for detecting a first reflection light of the first light beam reflected from the information record surface and generating a first light detection signal indicating the detected first reflection light; a second photo-detector for detecting a second reflection light of the second light beam reflected from the information record surface and generating a second light detection signal indicating the detected second reflection light; a decoding device for decoding the first and second light detection signals; an error rate detection device for detecting error rates of the first and second light detection signals when decoded by the decoding device; a selection device for selecting one of the decoded first and second light detection signals which has a lower error rate according to the detected error rates; and a reproduction process device for reproducing the information on the basis of the selected one of the decoded first and second light detection signals.

According to the fourth information reproducing apparatus, the light irradiation device irradiates the information record surface with the first light beam and the second light beam such that the first light beam and the second light beam form light spots arranged along the information track. At this time, the first light beam is applied onto the information record surface perpendicularly, and the second light beam is applied onto the information record surface obliquely in a direction perpendicular to the information track by a predetermined tilt angle. Then, the first reflection light is detected by the first photo-detector and the first light detection signal is generated, while the second reflection light is detected by the second photo-detector and the second light detection signal is generated. Then, the first and second light detection signals are decoded by the decoding device while the error rates of the first and second light detection signals when decoded by the decoding device are detected by the error rate detection device. Then, one of the decoded first and second light detection signals which has a lower error rate is selected by the selection device according to the detected error rates. Finally, the information is reproduced by the information reproducing device on the basis of the selected one of the decoded first and second light detection signals.

Accordingly, depending on the reading error which is dependent on the tilt condition of the information record surface, one of the first and second light detection signals can be selected which is less influenced by the tilt of the information record surface. Thus, even if there exists the tilt which badly influences the first light beam, the influence of the tilt can be compensated by the predetermined tilt angle of the second light beam, so that the correct reproduction process can be performed on the basis of the second light detection signal. Consequently, regardless of the tilt condition, the correct reproduction process can be performed by the second information reproducing apparatus of the present invention.

In the above described first to fourth information reproducing apparatuses of the present invention, the light irradiation device may be provided with: a light emitting element for emitting a light beam; and a light separating device for separating the emitted light beam into the first and second light beams. Thus, the construction of the optical system in the apparatus can be simplified. In this case, the light separating device may preferably be a grating. Thus, the construction of the optical system in the apparatus can be made even more simplified. Alternatively, the light irradiation device may be provided with a plurality of light emitting elements including a first light emitting element for emitting the first light beam and a second light emitting element for emitting the second light beam.

In the above described second and fourth information reproducing apparatus of the present invention, the selection device may be provided with: a comparison circuit for comparing the detected error rates with each other, and generating a comparison signal indicating one of the first and second light detection signal which has a lower error rate; and a select circuit for selecting one of the decoded first and second light detection signals according to the comparison signal.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 9A is a block diagram of an information reproducing apparatus as a second embodiment of the present invention, and FIG. 9B is a diagram showing a relationship between the information track and each light spot in the second embodiment;

DETAILED DESCRIPTION OF THE PREFERRED EMBODIMENTS

Referring to the accompanying drawings, embodiments of the present invention will be now explained.

(I) Principle of the Present Invention

Firstly, an operation principle used for preferred embodiments of the present invention will be explained with referring to FIGS. 1A to 3.

Figure 1A:
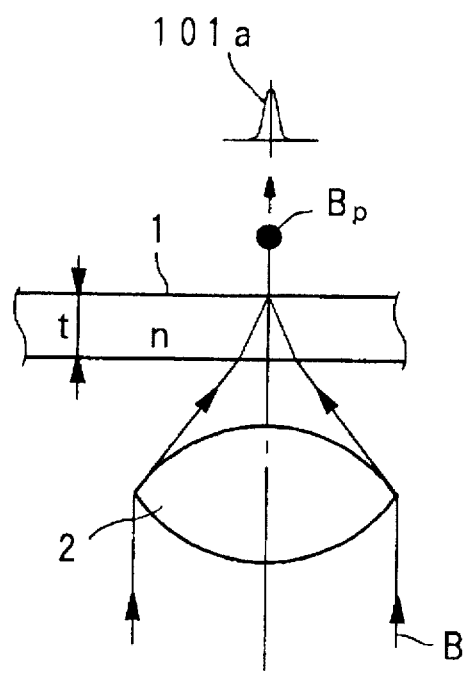
FIG. 1A and FIG. 1B, are diagrams to explain an operation principle used for preferred embodiments of the present invention.

In FIG. 1A, in an information reproducing apparatus, a light spot Bp is formed on an information record surface of an optical disc 1 by condensing a light beam B, which is a laser beam as the reproduction light beam and which does not have the comma aberration, by use of an objective lens 2 in case that there is no disc skew. By detecting the reflection light from the light spot Bp, the information is reproduced on the basis of the difference in the light intensity of the detected reflection light by the information reproducing apparatus.

In this case, since the information record surface of the optical disc 1 is perpendicular to the optical axis of the light beam B, and since the comma aberration is not given to the light beam B, the shape of the light spot Bp formed on the information record surface of the optical disc 1 is substantially completely rounded, and the light intensity distribution 101a within the light spot Bp is substantially symmetrical, as shown in FIG. 1A. Then, by forming the light spot Bp on the information track recorded with the information to be reproduced, the information on the information track is correctly reproduced.

Figure 1B:
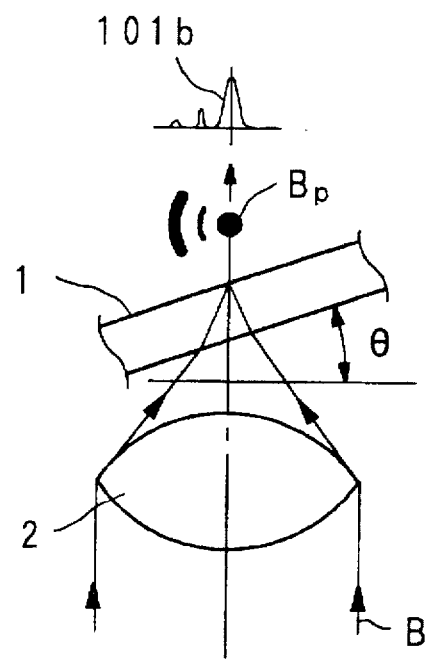

However, when the optical disc 1 is distorted by the aged deterioration or the stress applied when holding the optical disc 1 etc., the information record surface of the optical disc 1 is tilted with respect to the optical axis of the light beam B at the light irradiation portion which is irradiated with the light beam B as shown in FIG. 1B. Then, under the condition that the tilt of the information record surface with respect to the optical axis of the light beam B i.e. the disc skew is generated, if the optical disc 1 is irradiated with the light beam B in the same manner as the case of FIG. 1A, the light spot Bp at this time has the comma aberration, so that the shape of the light spot Bp is not circular any more as shown in FIG. 1B. The light intensity distribution 101b within the light spot Bp at this time has an asymmetrical wave shape as shown in FIG. 1B.

Here, the comma aberration is explained.

The light beam such as a laser beam which has passed through an optical system such as a prism, an objective lens, etc., has a wave front aberration. The wave front aberration corresponding to one object point is expressed in a form of the power series of the polar function $(R,\phi)$ of the pupil, which is expressed by a following expression (1) when the terms up to the sixth order are considered.

$$W(R,\phi) = W_{11}R\cos\phi + W_{20}R^2 + W_{22}R^2\cos^2\phi + \qquad (1)$$
$$W_{31}R^3\cos\phi + W_{33}R^3\cos^3\phi + W_{40}R^4 +$$
$$W_{42}R^4\cos^2\phi + W_{51}R^5\cos\phi + W_{60}R^6$$

Here, the function $W(R,\phi)$ represents the wave front aberration. Further, among the terms in the right hand of the expression (1), the term $W_{20}$ corresponds to the defocus, the term $W_{22}$ corresponds to the astigmatism, the term $W_{31}$ corresponds to the coma aberration, and the term $W_{40}$ corresponds to the spherical aberration.

The coma aberration $W_{31}$ in the expression (1) is also generated by the disc skew as shown in FIG. 1B. The magnitude of the coma aberration $W_{31}$ in this case is expressed by a following expression (2).

$$W_{31}=(t/2)*\{n^2(n^2-1) \sin \theta \cos \theta\}/\{(n^2-\sin^2 \theta)^{5/2}\}*(NA)^3 \qquad (2)$$

In the expression (2), the reference numeral t represents the thickness of the optical disc 1 from its surface to its information record surface, n represents the refraction coefficient of the light protection layer of the optical disc 1, which is made of a resin layer, for example, to protect the information record surface, with respect to the light beam B, $\theta$ represents the disc skew (angle), and NA represents the numerical aperture of the objective lens 2. For example, under the condition of $\theta=0.25°$, NA=0.6, n=1.57 and t=0.6 mm, the coma aberration $W_{31}$ is obtained by the expression (2) as $W_{31}=0.214$ µm.

Figure 1C:
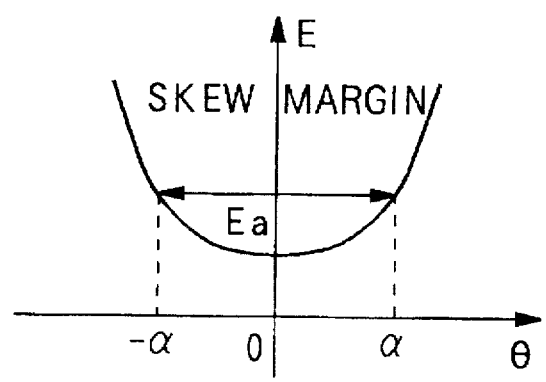
FIG. 1C is a graph showing a relationship between a disc skew and a reading error in case of FIGS. 1A and 1B.

When this coma aberration $W_{31}$ is generated, since the shape of the light spot Bp is expanded in the radial direction of the optical disc 1 as shown in FIG. 1B, the light spot Bp covers not only the information track to be reproduced but also the information track adjacent to the information track to be reproduced, so that the information of this adjacent information track is mixed as a cross talk into the information of the information track to be reproduced. Then, a reading error E is increased in the information to be reproduced. The reading error E and the disc skew $\theta$ has a relationship as shown in FIG. 1C. Here, α represent the disc skew corresponding to the disc error Ea allowable in the processes in the signal processing system. Namely, ±α prescribes the skew margin of the disc skew as shown in FIG. 1C.

Figure 2A:
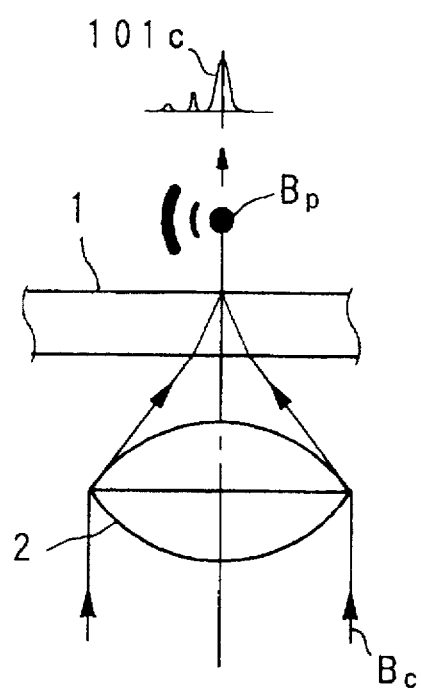
FIG. 2A and FIG. 2B, are diagrams to explain an operation principle used for the preferred embodiments of the present invention.
Figure 2B:
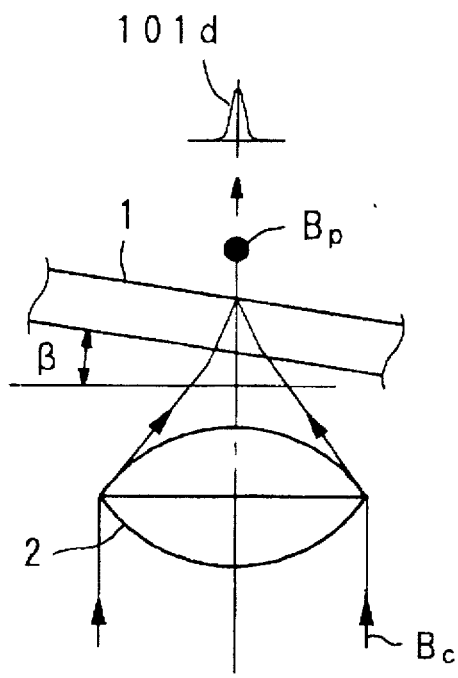

In each of FIGS. 2A and 2B, a light beam Bc, to which the coma aberration is given in advance of reaching the objective lens 2, is irradiated onto the optical disc 1, in place of the light beam B, to which no coma aberration is given, as shown in FIGS. 1A and 1B respectively.

As shown in FIG. 2A, if the optical disc 1 is irradiated with the light beam Bc which optical axis is perpendicular to the optical disc 1, since the light beam Bc has the coma aberration $W_{31}$ in advance, the shape of the light spot Bp is expanded in the radial direction of the optical disc 1 in the similar manner as in the case of FIG. 1B. The light intensity distribution 101c within the light spot Bp at this time has an asymmetrical wave shape as shown in FIG. 2A.

Here, as shown in FIG. 2B, if the optical disc 1 is tilted so that the disc skew β is generated, the comma aberration $W_{31}$ in the light beam Bc cancels or reduces the comma aberration generated by this disc skew β. When those comma aberrations are cancelled by each other, as shown in FIG. 2B, the shape of the light spot Bp becomes substantially completely rounded and the light intensity distribution 101d within the light spot Bp is substantially symmetrical in the same manner as the light intensity distribution 101a shown in FIG. 1A (in which no coma aberration is given to the light beam and no aberration is generated due to the disc skew).

Figure 2C:
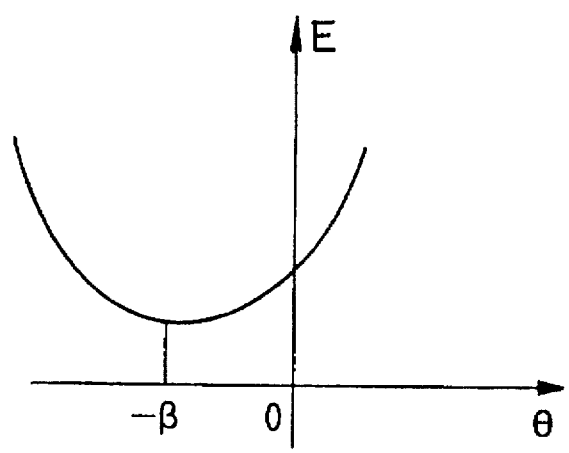
FIG. 2C is a graph showing a relationship between a disc skew and a reading error in case of FIGS. 2A and 2B.

Assuming that the disc skew θ is equal to β when the shape of the light spot Bp becomes substantially completely rounded, the reading error E and the disc skew θ in case of using the light beam Bc have the relationship as shown in FIG. 2C, in which the reading error E tales its minimum value at the angle β.

Therefore, in the present invention, a plurality of light beams are generated in the optical system such that at least one of them is the light beam Bc, to which the coma aberration is given in advance of irradiation. More concretely, for example, an original light beam Bo is divided into three light beams, such that one of the light beams becomes the light beam B as an ordinary reproduction light beam, to which no comma aberration is given, for a normal reproduction of the optical disc 1 having no disc skew, another of the light beams becomes a light beam Bc+ as an extraordinary reproduction light beam, to which a plus comma aberration is given, for a special reproduction of the optical disc 1 having the disc skew, and another of the light beams becomes a light beam Bc– as an extraordinary reproduction light beam, to which a minus comma aberration is given, for a special reproduction of the optical disc 1 having the disc skew. Here, the "plus" comma aberration is defined as a comma aberration in one of the directions, which are perpendicular to the information reading direction (i.e. the direction of the information track TR) on the information record surface of the optical disc 1, while the "minus" comma aberration is defined as a comma aberration in the direction opposite to the plus comma aberration on the information record surface.

Figure 3:
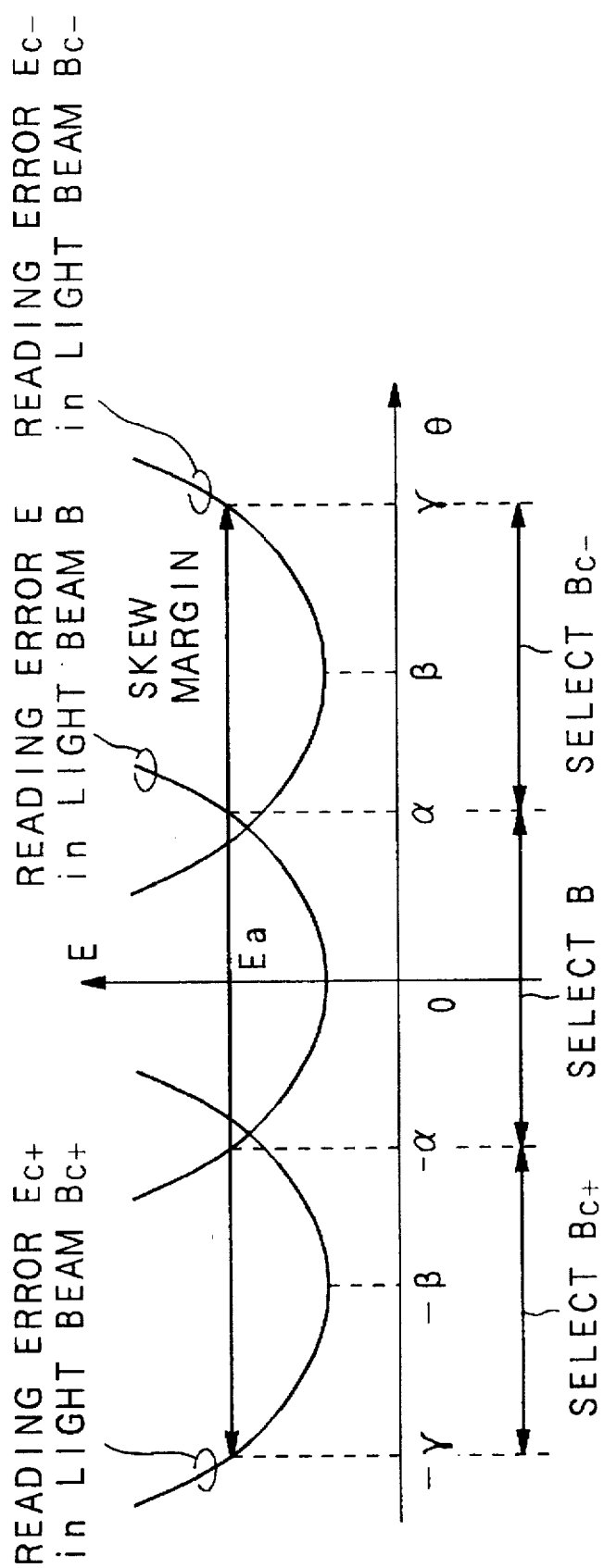
FIG. 3 is a graph showing the operation principle used for the preferred embodiments of the present invention.
Figure 4:
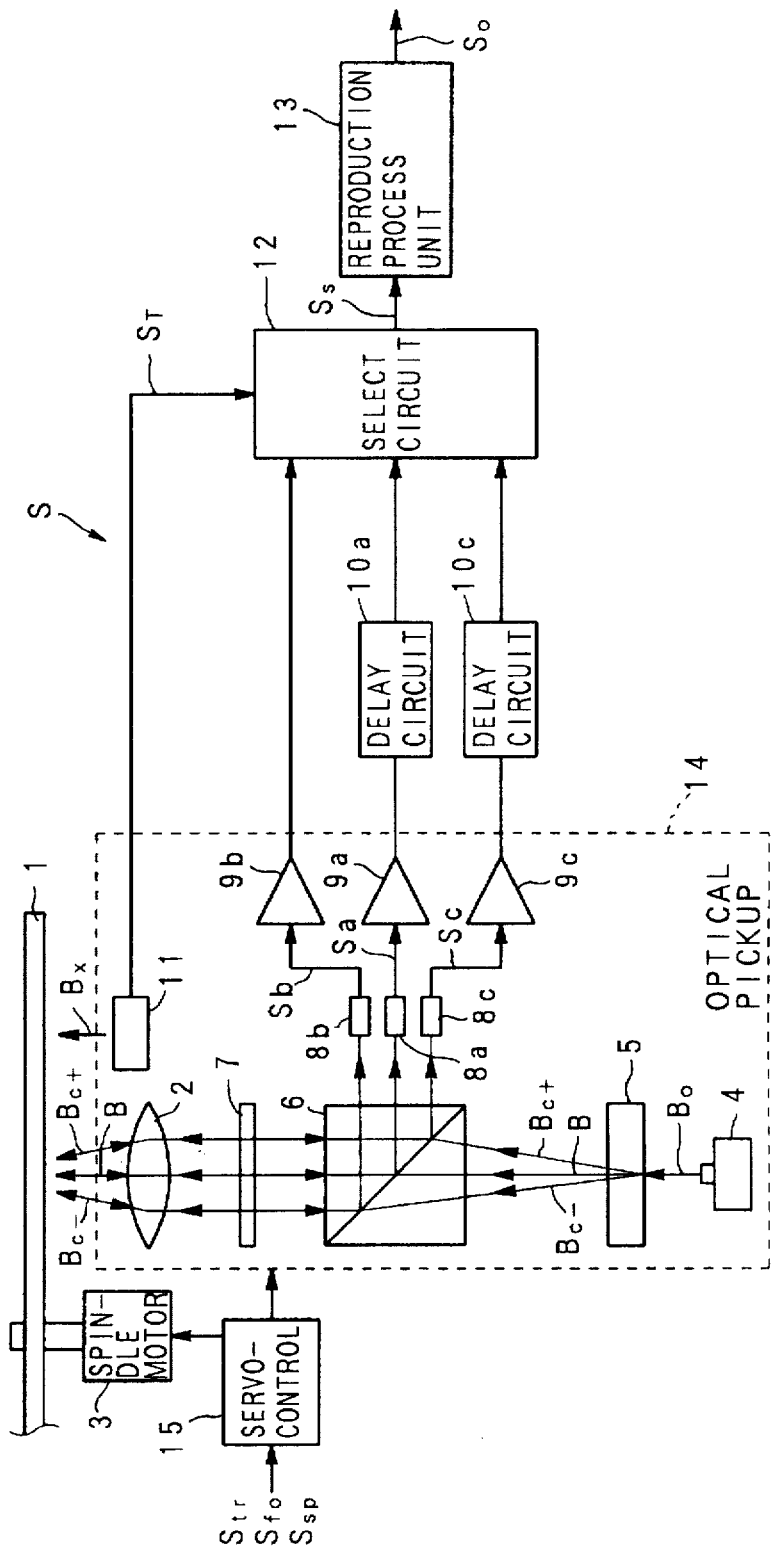
FIG. 4A is a block diagram of an information reproducing apparatus as a first embodiment of the present invention.
FIG. 4B is a diagram showing a relationship between the information track and each light spot in the first embodiment.

Then, the light beam B, the light beam Bc+ and the light beam Bc– are applied onto one information track. At this time, if there exists a disc skew θ of the optical disc 1, the coma aberration $W_{31}$ is generated at the light spot Bp as for the light beam B, resulting in that the reflection light of the light beam B includes the cross talk. However, even in this case, as for either one of the light beam Bc+ and the light beam Bc–, the influence of the coma aberration due to the disc skew θ is reduced by either one of the plus coma aberration $W_{31}$ or the minus coma aberration $W_{31}$. Thus, the cross talk is reduced in either one of the reflection lights of the light beams Bc+ and Bc–. Therefore, by selecting this reflection light in which the cross talk is reduced (i.e. the reflection light of the light beam Bc+ or Bc– including the comma aberration $W_{31}$ which reduces or cancels the influence of the comma aberration due to the disc skew θ), and by reproducing the information on the basis of this selected reflected light, it becomes possible to perform a correct information reproduction by reducing the influence of the disc skew θ. Further, at this time, the skew margin is equal to the sum of the skew margins of the light beams B, Bc+ and Bc– as shown in FIG. 3, and is much larger than the case of reproducing the information by use of a single light beam B. As shown in FIG. 3, within the skew margin, by selecting one of three light detection signals based on the light beams B, Bc+ and Bc– respectively, in accordance with the disc skew θ, the reading error E can be restrained to be lower than the allowable reading error Ea in the skew margin.

The concrete embodiments based on the above mentioned operation principle of the present invention will be nextly described.

(II) First Embodiment

A first embodiment of the present invention will be explained hereinbelow with referring to FIGS. 4A to 8.

The construction of an information reproducing apparatus as the first embodiment is firstly explained with referring to FIG. 4A.

In FIG. 4A, an information reproducing apparatus S is provided with: the aforementioned objective lens 2 for condensing the light beams B, Bc+ and Bc– and forming light spot Bp, Bp+ and Bp– respectively on one information track TR of the optical disc 1, to which information is recorded on the information track TR. The information reproducing apparatus S is also provided with: a spindle motor 3 for rotating the optical disc 1; a semiconductor laser 4 for emitting the original light beam Bo as the reproduction light beam; a grating 5 for separating the light beam Bo into the light beams B, Bc+ and Bc– such that the coma aberration is not given to the light beam B, the predetermined plus coma aberration is given to the light beam Bc+, and the predetermined minus coma aberration is given to the light beam Bc–; a beam splitter 6 for transmitting the light beams B, Bc+ and Bc– from the grating 5 therethrough and reflecting the reflection lights of each of the light beams B, Bc+ and Bc– respectively from the optical disc 1 toward photo-detectors 8a, 8b and 8c by virtue of the difference in the polarization plane of the light; and a λ/4 plate 7 for rotating the polarization planes of the light beams B, Bc+ and Bc– respectively from the beam splitter 6, and also the polarization planes of the reflection lights respectively from the optical disc 1 by predetermined angles. The information reproducing apparatus S is further provided with the photo-detectors 8a, 8b and 8c. The photo-detectors 8a, 8b and 8c are adapted to detect the reflection lights of the light beams B, Bc+ and Bc– from the optical disc 1 respectively, convert the detected lights to light detection signals Sa, Sb and Sc respectively, and output the light detection signals Sa, Sb and Sc respectively. The information reproducing apparatus S is further provided with: head amplifiers 9a, 9b and 9c for amplifying the light detection signals Sa, Sb and Sc respectively; and delay circuits 10a and 10c for delaying the light detection signals Sa and Sc by predetermined delay amounts respectively. In the present embodiment, the information reproducing apparatus S is especially provided with: a tilt sensor 11 for detecting the disc skew of the optical disc 1 at the position of the information track TR by emitting a detection beam Bx to the information track TR which is irradiated with the light beams B, Bc+ and Bc−, and by detecting the reflection light of the detection beam Bx and for outputting the tilt signal $S_T$ indicating the detected disc skew. The information reproducing apparatus S is further provided with: a select circuit 12 for selecting one light detection signal corresponding to the light beam which can reduce the influence of the coma aberration due to the disc skew, out of the light detection signals Sa, Sb and Sc on the basis of the tilt signal $S_T$, and for outputting the selected light detection signal Ss; and a reproduction process unit 13 including a decoder and a D/A convertor for applying an reproduction process to the selected light detection signal Ss to output a reproduction signal So.

The objective lens 2, the semiconductor laser 4, the grating 5, the beam splitter 6, the λ/4 plate 7, etc. are included in an optical pickup 14. The information reproducing apparatus S is further provided with a servo-control unit 15 for performing a tracking servo-control and a focus servo-control for the optical pickup 14 and a spindle servo-control for the spindle motor 3 on the basis of a tracking error signal Str, a focus error signal Sfo and a spindle error signal Ssp generated by the reproduction process unit 12 respectively.

Nextly, the operation of the above described information reproducing apparatus S will be explained with referring to FIGS. 4A and 4B.

In FIG. 4A, the light beam Bo, which is emitted from the semiconductor laser 4, is separated by the grating 5 into three light beams i.e. the light beam B which does not have the coma aberration, the light beam Bc+ which has the plus coma aberration, and the light beam Bc− which has the minus coma aberration. Then, the light beams B, Bc+ and Bc− are transmitted through the beam splitter 6 and the λ/4 plate 7, condensed by the objective lens 2 and applied onto the information track TR where the information to be reproduced is recorded on the optical disc 1. At this time, light spots Bp, Bp+ and Bp− are formed by the light beams B, Bc+ and Bc− respectively on one information track TR as shown in FIG. 4B. In FIG. 4B, the coma aberrations are generated at the light spots Bp+ and Bp− in the direction perpendicular to the direction of the information track on the information record surface, respectively.

Then, the reflection lights originated from the light beams B, Bc+ and Bc− respectively, which have been modulated by information pits and grooves etc. arranged on the information track TR, are inputted again to the beam splitter 6 through the objective lens 2 and the λ/4 plate 7. At this time, since the polarization plane of each reflection light has been rotated by the λ/4 plate 7, the reflection lights are reflected by the beam splitter 6, so that the reflection lights are inputted to the photo-detectors 8a, 8b and 8c respectively. Then, the inputted reflection lights are converted by the photo-detectors 8a, 8b and 8c to the light detection signals Sa, Sb and Sc respectively. The light detection signals Sa, Sb and Sc are amplified by the head amplifier 9a, 9b and 9c respectively, and outputted to the select circuit 12. At this time, the light detection signal 9a is delayed by the delay circuit 10a by a first predetermined delay amount, and the light detection signal 9c is delayed by the delay circuit 10c by a second predetermined delay amount before they are inputted to the select circuit 12.

Here, the reason why the delay process is applied to each of the light detection signals 9a and 9c (but not to the light detection signal 9b) is as following. Namely, as shown in FIG. 4B, the light spots Bp, Bp+ and Bp− are shifted to each other along the disc rotation direction on the information track TR when they are formed by the light beams B, Bc+ and Bc− respectively. Thus, when one piece of information on the information track TR is considered, the light beam Bc+ is modulated by this one piece of information earlier than the light beams Bc and Bc−. In the same manner, the light beam Bc is modulated by this one piece of information earlier than light beam Bc−. Thus, certain time differences exist between the light detection signals Sa, Sb and Sc corresponding to this one piece of information in accordance with the positional shifts of the light spots Bp, Bp+ and Bp− respectively. Here, in the present embodiment/since the selected light detection signal Ss is obtained by switching the light detection signals Sa, Sb and Sc in accordance with the disc skew θ, in order to maintain the continuity of the information indicated by the selected light detection signal Ss, the light detection signal Sa and Sc are respectively delayed by the respective predetermined delay amounts, so that the timing of the light detection signal Sa and the timing of the light detection signal Sc are matched to that of the light detection signal Sb.

While the light detection signals Sa, Sb and Sc are inputted to the select circuit 12, the detection beam Bx is applied onto the information track TR, which is irradiated with the light beams B, Bc+ and Bc−, by the tilt sensor 11. Then, the disc skew θ of the optical disc 1 is detected on the basis of the reflection light of the detection beam Bx, and the tilt signal $S_T$ corresponding to the detected disc skew θ is outputted to the select circuit 12. At this time, the light spot Bpx formed by the detection beam Bx is applied onto a position shown in FIG. 4B.

In the select circuit 12, in accordance with the tilt signal $S_T$, one of the light detection signals Sa, Sb and Sc is selected which is originated from the light beam having the coma aberration $W_{31}$ able to reduce the influence of the coma aberration due to the presently detected disc skew θ (i.e. the coma aberration $W_{31}$ by which the reading error due to the presently detected disc skew θ falls in the allowable range), and is outputted as the selected light detection signal Ss.

More concretely, if the disc skew θ is within the range between −α and +α in FIG. 3, the light detection signal Sa corresponding to the light beam B is selected as the selected light detection signal Ss. If the disc skew θ is within the range between +α and +γ in FIG. 3, the light detection signal Sb corresponding to the light beam Bc− is selected as the selected light detection signal Ss. If the disc skew θ is within the range between −γ and −α in FIG. 3, the light detection signal Sc corresponding to the light beam Bc+ is selected as the selected light detection signal Ss. Then, the selected light detection signal Ss is inputted to the reproduction process unit 13. Finally, the decoding process, the D/A-converting process etc. are applied to the selected light detection signal Ss, and the resultant processed signal is outputted as the reproduction signal So.

Here, the tilt sensor 11 will be explained in more detail with referring to FIG. 5.

Figure 5:
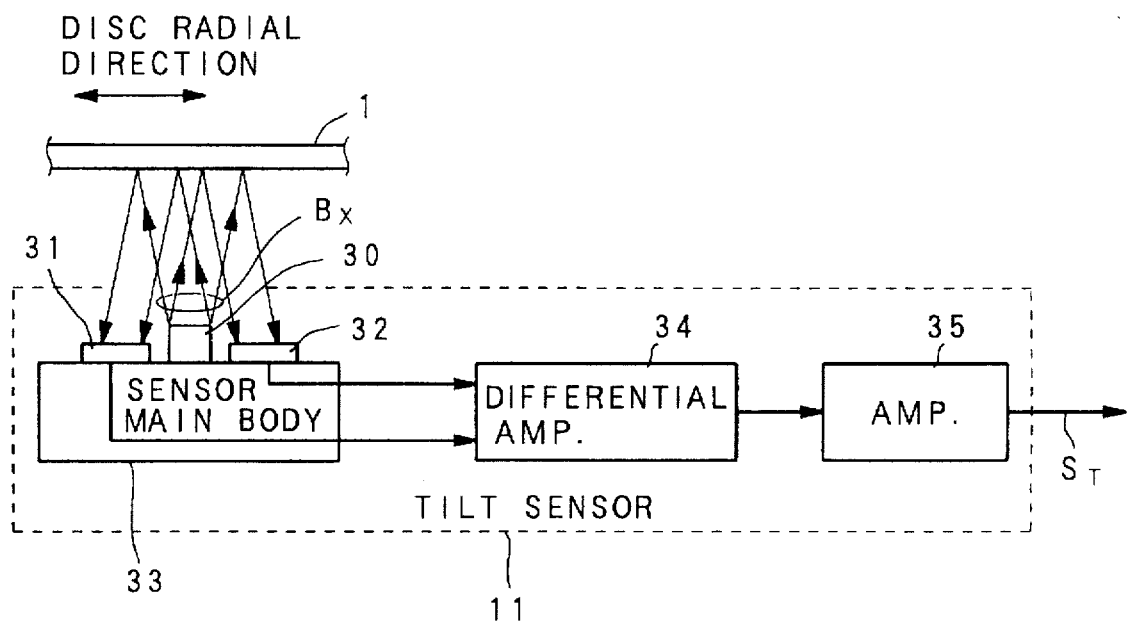
FIG. 5 is a block diagram of a tilt sensor used in the first embodiment.

In FIG. 5, the tilt sensor 11 is provided with: a light emitting element 30 for emitting the detection beam Bx; photo-detectors 31 and 32 spaced from each other in the disc radial direction of the optical disc 1 for respectively receive the reflection light of the detection beam Bx from the optical disc 1; a sensor main body 33 for holding the light emitting element 30 and the photo-detectors 31 and 32; a differential amplifier 34 for generating a differential signal between an output signal of the photo-detector 31 and an output signal of the photo-detector 32; an amplifier 35 for amplifying the differential signal outputted from the differential amplifier 34 and outputting it as the tilt signal $S_T$.

Nextly, the operation of the tilt sensor 11 will be explained.

In FIG. 5, the detection beam Bx emitted from the light emitting element 30 is reflected by the information record surface of the optical disc 1. The reflection light of the detection beam Bx is detected by the photo-detectors 31 and 32. At this time, since the photo-detectors 31 and 32 are spaced from each other along the disc radial direction of the optical disc 1, if the disc skew θ of the optical disc 1 exists in the disc radial direction, a difference is generated between the light amount of the reflection light received by the photo-detector 31 and the light amount of the reflection light received by the photo-detector 32. Therefore, the differential signal between the output signals of the photo-detectors 31 and 32 generated by the differential amplifier 34, corresponds to the disc skew θ at the present time. Then, this differential signal is amplified by the amplifier 35 and is outputted as the tilt signal $S_T$ to the select circuit 12.

In this manner, the tilt signal $S_T$ corresponding to the disc skew θ can be obtained by the tilt sensor 11.

Nextly, the grating 5 will be explained in more detail with referring to FIGS. 6A to 8.

Figure 6A:
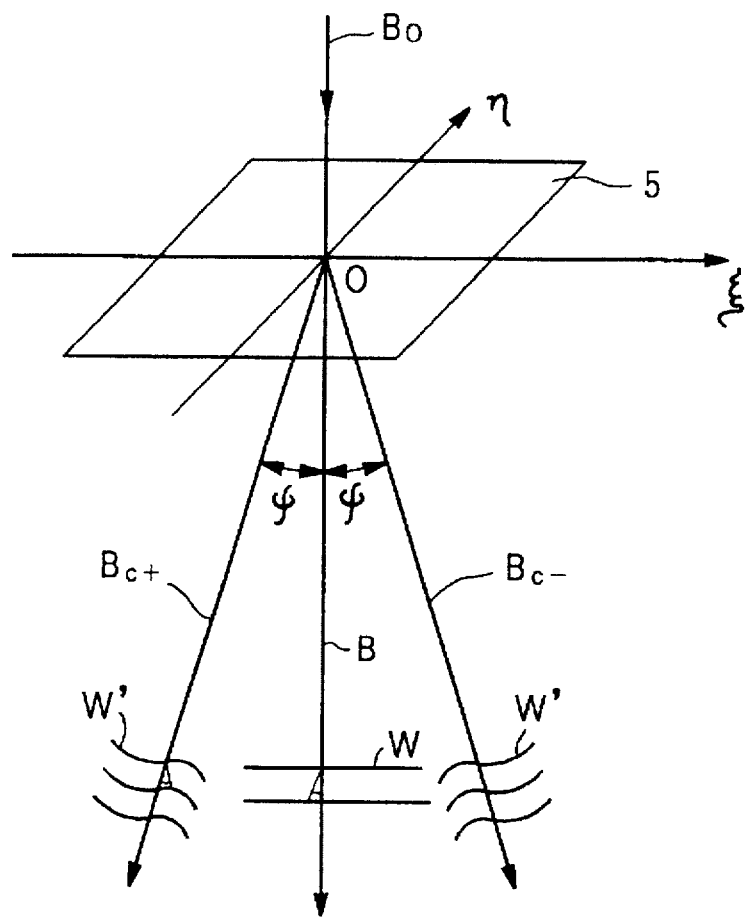
FIG. 6A is a diagram to explain coordinate axes and interference fringes at a grating used in the first embodiment.

Firstly, the coordinate axes of the grating 5 used in the present explanation is explained with referring to FIG. 6A.

As shown in FIG. 6A, in the present explanation, a η–ξ plane which has a η axis and a ξ axis is set on the grating 5. It is assumed that the light beam Bo is incident perpendicular to the η–ξ plane at the junction O of the η axis and the ξ axis, is diffracted by the grating 5 and is separated into the light beams B, Bc+ and Bc– which are parallel to the ξ axis, and that the diffraction angle of this separation is ψ. In order to obtain the light beams B, Bc+ and Bc– in this manner, the grating pattern of the grating 5 is given as interference fringes of the wave front W corresponding to the light beam B and the wave front W' corresponding to each of the light beams Bc+ and Bc– as shown in FIG. 6A. This interference fringes are expressed by a following expression (3).

$$m\lambda = b_1\xi + b_4 (\eta^2+\xi^2)\eta \tag{3}$$

wherein $$b_1 = \sin\psi, \quad b_4 = W_{31}/R^3$$

m: integer number

λ: wavelength of the light beam Bo (B)

$W_{31}$: coma aberration which is given to the light beam Bc (as expressed in by the expression (2))

R: radius of the objective pupil of the objective lens 2

In this expression (3), the disc skew θ in the expression (2) is replaced by the disc skew β shown in FIG. 2C or FIG. 3.

The above explained expression (3) is the expression of the interference fringes to separate the light beam Bc+. The expression of the interference fringes to separate the light beam Bc– is as following.

$$m\lambda = b_1\xi - b_4 (\eta^2+\xi^2)\eta \tag{4}$$

In the actual design, it may be enough to consider only the expression (3). Further, the above expressions (3) and (4) are applied to the case that the diffraction direction (i.e. the direction parallel to the ξ axis) and the direction of the coma aberration are perpendicular to each other. By the interference fringes expressed by the expression (3), the diffraction angle of the light beam Bc+ becomes +ψ (degrees) and the diffraction angle of the light beams Bc– becomes –ψ (degrees). Thus, the grating patterns in which the coma aberrations are ±$W_{31}$ (μm) can be obtained. The light beam Bc, which has been separated by this grating pattern, has the coma aberration $W_{31}$ which can cancel the coma aberration due to the disc skew θ when θ=β (in FIG. 2C or FIG. 3).

Figure 7:
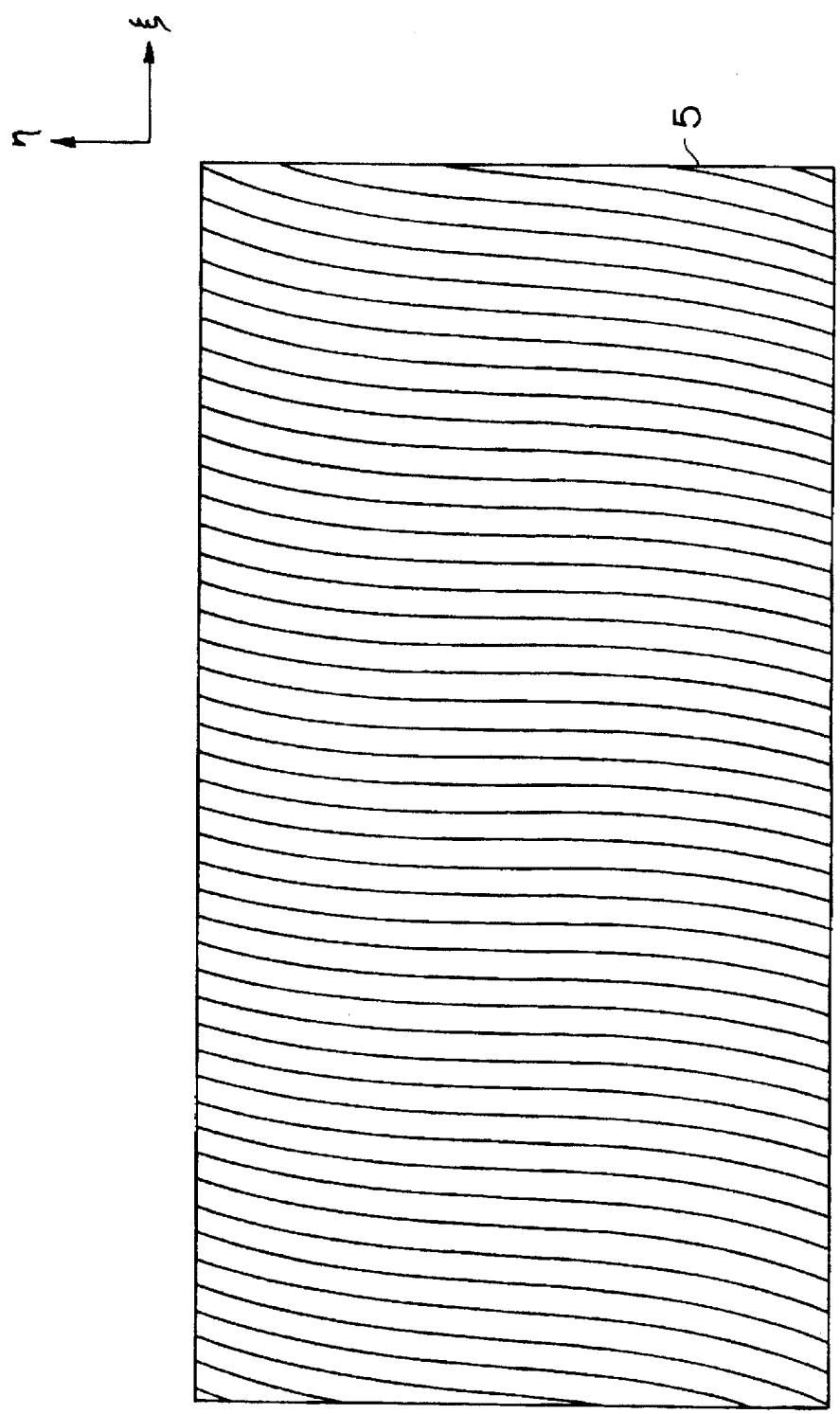
FIG. 7 is one diagram showing a grating pattern used in the first embodiment.

Here, as an example of the grating pattern, the grating pattern of the grating 5 to obtain the light beams B, Bc+ and Bc– under the condition of α=0.25°, NA=0.6, n=1.57, t=0.6 mm, R=2500 μm, ψ=0.293°, is shown in FIG. 7. In FIG. 7, the average pitch P of the interference fringes is, for example, equal to 0.133 (mm) since ξ is substantially equal to mλ/$b_1$ by solving the expression (3) with respect to ξ under the condition of λ=0.69 μm.

Figure 6B:
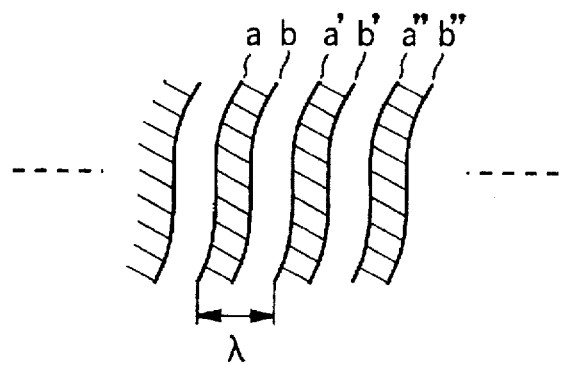
FIG. 6B is a diagram showing the interference fringes.

By the way, at the time of actually producing the grating 5, each pattern (i.e. each interference fringe) has a width as partially indicated by FIG. 6B. At this time, if the interference fringes a, a', a", . . . , satisfy the above expression (3), the interference fringes b, b', b", . . . . will satisfy the following expression (5).

$$(m+\tfrac{1}{2})\lambda = b_1\xi' + b_4 (\eta^2+\xi'^2)\eta \tag{5}$$

Nextly, the grating pattern is concretely obtained in case that the interference fringe has a width under the condition that the wave length of the light beam Bo is 0.69 μm.

If η is not equal to "0", ξ is obtained as following according to the above expression (3).

$$\xi = \{-b+(b^2-4ac)^{1/2}\}/2a \tag{6}$$

If η is not equal to "0", ξ' is obtained as following according to the above expression (5).

$$\xi' = \{-b+(b^2-4ad)^{1/2}\}/2a \tag{7}$$

wherein a=$b_4\eta$, b=$b_1$, c=$b_4\eta^3$–mλ, d=$b_4\eta^3$–(m+½)λ in the expressions (6) and (7)

Here, in order to separate the light beam Bc, which has the coma aberration $W_{31}$ (corresponding to β=0.5°) to cancel the coma aberration due to the disc skew θ=0.5°, the coma aberration $W_{31}$ becomes as following under the condition of θ=0.5°, t=1200 μm, n=1.57, NA=0.6.

$$W_{31}=0.856323$$

Therefore, under the condition of ψ=0.293° and R=2460 μm, $b_1$ and $b_4$ become as following.

$$b_1=5.11379\times10^{-3}$$

$$b_4=5.75217\times10^{-11}$$

Thus, since λ=0.69 μm in the above expressions (6) and (7), a to d become as following.

$$a=5.75217\times10^{-11}\eta$$

$$b=5.11379\times10^{-3}$$

$$c = 5.75217 \times 10^{-11} \eta^3 - 0.69 \, m$$

$$d = 5.75217 \times 10^{-11} \eta^3 - 0.69 \, (m + \tfrac{1}{2})$$

If $\eta$ is equal to "0" in the above expressions (6) and (7), $\xi$ and $\xi'$ become as following.

$$\xi = 0.69 \, m/b$$

$$\xi' = 0.69 \, (m + \tfrac{1}{2})/b$$

wherein $b = b_1 = 5.11379 \times 10^{-3}$

Figure 8:
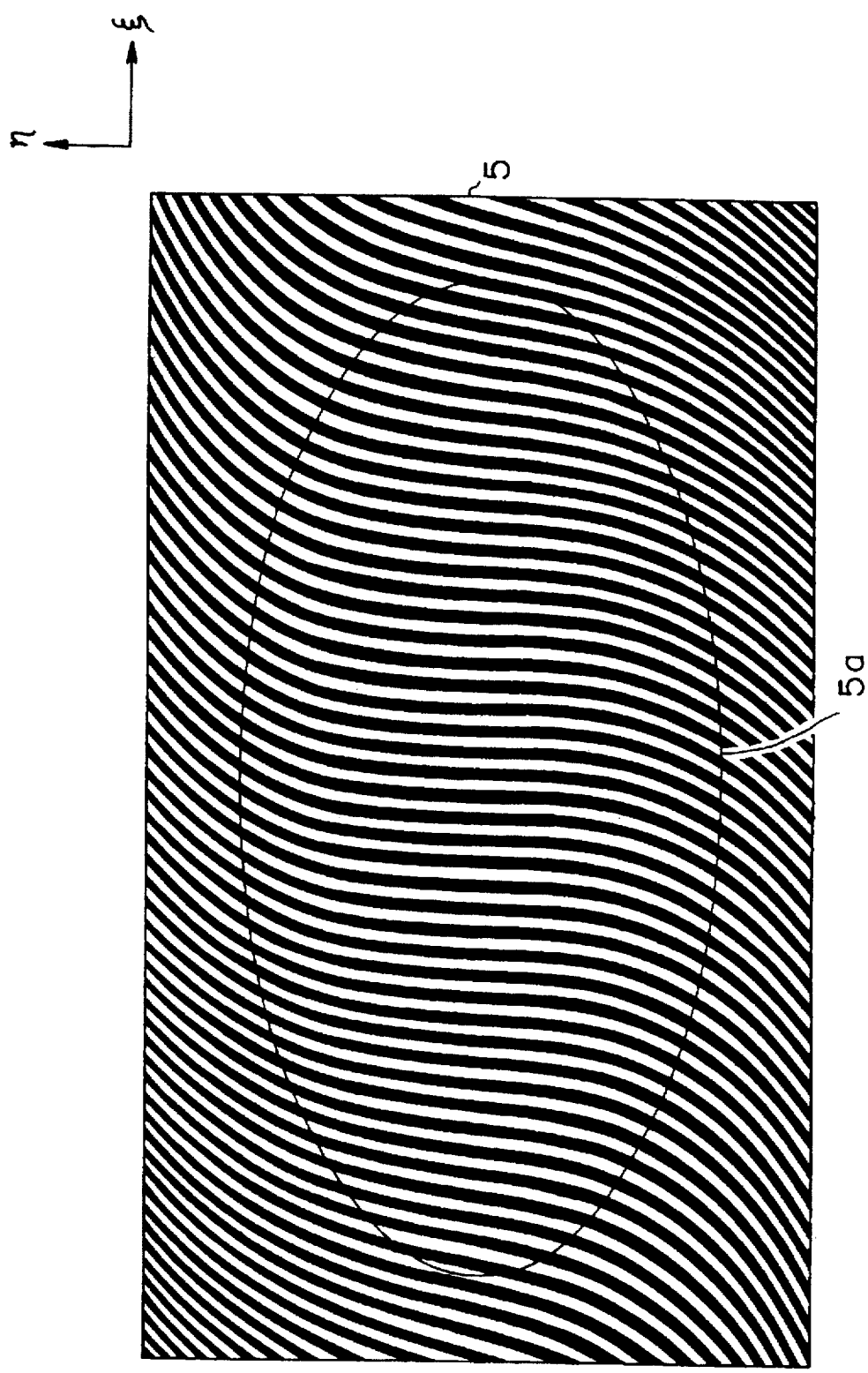
FIG. 8 is another diagram showing a grating pattern used in the first embodiment.

The grating pattern of the grating 5 which is produced according to the above calculation results is shown in FIG. 8. In FIG. 8, each black portion indicates the groove while an ellipsoidal 5a in the grating 5 indicates the incident range of the light beam Bo.

In the above calculations, the cross section of the light beam Bo incident to the grating 5 is normally elliptical as shown in FIG. 8. In order to shape this cross section of the light beam Bo substantially completely rounded when it is applied onto the optical disc 1, $\eta'$ may be preferably employed in place of $\eta$ as following so as to shape the light beam Bo by r times in the direction of $\eta$.

$$\eta' = \eta r$$

Here, r may be 2.06, for example.

As described above in detail, according to the first embodiment, the light beams B, Bc+ and Bc− are generated out of the light beam Bo by use of the grating 5, and are applied onto one information track TR. One of the light detection signals Sa, Sb and Sc originated from one of the light beams B, Bc+ and Bc− which has the coma aberration $W_{31}$ able to reduce the influence of the coma aberration due to the disc skew θ, is selected. The information is reproduced on the basis of the selected light detection signal Ss. Accordingly, even if there exists the disc skew θ of the optical disc 1, the information reproducing apparatus S which can perform a correct information reproducing operation can be realized by use of a relatively simple structure in a relatively small size with relatively low cost and without the use of a mechanically movable element.

(III) Second Embodiment

A second embodiment of the present invention will be explained hereinbelow with referring to FIGS. 9A and 9B.

In the aforementioned first embodiment, the selection of the light detection signals Sa, Sb and Sc is performed by the select circuit 12 on the basis of the tilt signal $S_T$ from the tilt sensor 11. In contrast to this feature of the first embodiment, the second embodiment has such a feature that error rates of the light detection signals Sa, Sb and Sc are respectively detected upon decoding them, and that the light detection signal which has the lowest error rate among those is selected as the selected light detection signal Ss on the basis of the detected error rates.

The construction of an information reproducing apparatus as the second embodiment is firstly explained with referring to FIG. 9A. In FIG. 9A, the constitutional elements same as those in FIG. 4A carry the same reference numerals and the explanations thereof are omitted.

In FIG. 9A, an information reproducing apparatus S' is provided with: a decoder 20a for decoding the light detection signal Sa, which has been delayed by the delay circuit 10a and for outputting a decoded light detection signal $S_{Da}$; a decoder 20b for decoding the light detection signal Sb, which has been amplified by the head amplifier 9b and for outputting a decoded light detection signal $S_{Db}$; a decoder 20c for decoding the light detection signal the light detection signal Sc, which has been delayed by the delay circuit 10c and for outputting a decoded light detection signal $S_{Dc}$; counters 21a, 21b and 21c for detecting error rates of the reading errors of the light detection signals Sa, Sb and Sc respectively upon decoding them and for outputting error rates $S_{Ea}$, $S_{Eb}$ and $S_{Ec}$; a compare circuit 22 for comparing the detected error rates $S_{Ea}$, $S_{Eb}$ and $S_{Ec}$ with each other and for outputting a comparison signal Sp, which indicates the light detection signal which error rate is the lowest among those compared error rates, to a select circuit 23; the select circuit 23 for outputting one of the decoded light detection signals $S_{Da}$, $S_{Db}$ and $S_{Dc}$, which has the lowest error rate in accordance with the comparison signal Sp as the selected light detection signal Ss; and a reproduction process unit 24 including D/A convertor etc. for performing the reproduction process with respect to the selected light detection signal Ss and for outputting the processed signal as the reproduction signal So. Thus, the light spot Bp, Bp+ and Bp− are respectively formed of the light beams Bc, Bc+ and Bc− on one information track TR as shown in FIG. 9B.

Nextly, the operation of the above mentioned second embodiment will be explained.

In FIG. 9A, the light detection signal Sb, which has been amplified by the head amplifier 9b and the light detection signals Sa and Sc, which have been delayed by the delay circuits 10a and 10c respectively, are decoded by the decoders 20a, 20b and 20c respectively, and are outputted as the decoded light detection signals $S_{Da}$, $S_{Db}$ and $S_{Dc}$ respectively to the select circuit 23. On the other hand, the error signals at the time of decoding the light detection signals Sa, Sb and Sc are inputted to the counters 21a, 21b and 21c respectively, where the error rates $S_{Ea}$, $S_{Eb}$ and $S_{Ec}$ of the reading errors at the time of decoding the light detection signals Sa, Sb and Sc are detected. Then, the detected error rates $S_{Ea}$, $S_{Eb}$ and $S_{Ec}$ are compared with each other by the compare circuit 22, so that the error rate which is the lowest among those three error rates is selected and the comparison signal Sp indicating the light detection signal corresponding to the selected error rate is outputted to the select circuit 23. Then, by the select circuit 23, the decoded light detection signal which has the lowest error rate is selected among the decoded light detection signals $S_{Da}$, $S_{Db}$ and $S_{Dc}$ on the basis of the comparison signal Sp, and the selected light detection signal Ss is outputted. After that, on the basis of the selected light detection signal Ss, the reproduction process such as a D/A conversion process is performed by the reproduction process unit 24, and finally the reproduction signal So is outputted.

By the above described operation, one of the decoded light detection signals $S_{Db}$ and $S_{Dc}$, each of which is originated from the light beam having the coma aberration most suitable for cancelling or reducing the influence of the coma aberration due to the disc skew of the optical disc 1, is selected (or the decoded light detection signal $S_{Da}$ is selected if there exists no or little disc skew) as the selected light detection signal Ss in the manner shown in FIG. 3, and the reproduction signal So is outputted on the basis of this selected light detection signal Ss.

As described above in detail, according to the second embodiment, the tilt sensor as in the first embodiment is not necessary, and the most suitable light detection signal can be electrically selected as an advantageous effect in addition to the effect of the first embodiment. The information reproducing apparatus S', which can perform a correct information reproduction with respect to the disc skew of the optical disc 1 by use of a relatively simple construction without the use of the mechanically movable element, can be realized.

In the above described first and second embodiments, two light beams Bc+ and Bc− are generated as the light beams have the coma aberration. However, the present invention is not limited to this feature. Instead, if the disc skew θ is practically limited to be only either one of the plus and minus skews (i.e. the distortion of the optical disc 1 substantially exists only either one of the upward direction and the downward direction in FIG. 4A or FIG. 9A), just one light beam Bc+ or Bc− which has the coma aberration $W_{31}$ able to cancel or reduce the coma aberration due to this disc skew θ in one direction may be generated, so that the light detection signal Sa is selected when no disc skew exists while the light detection signal Sb or Sc is selected as the most suitable light detection signal Ss when the disc skew θ exists.

(IV) Third Embodiment

Figure 10:
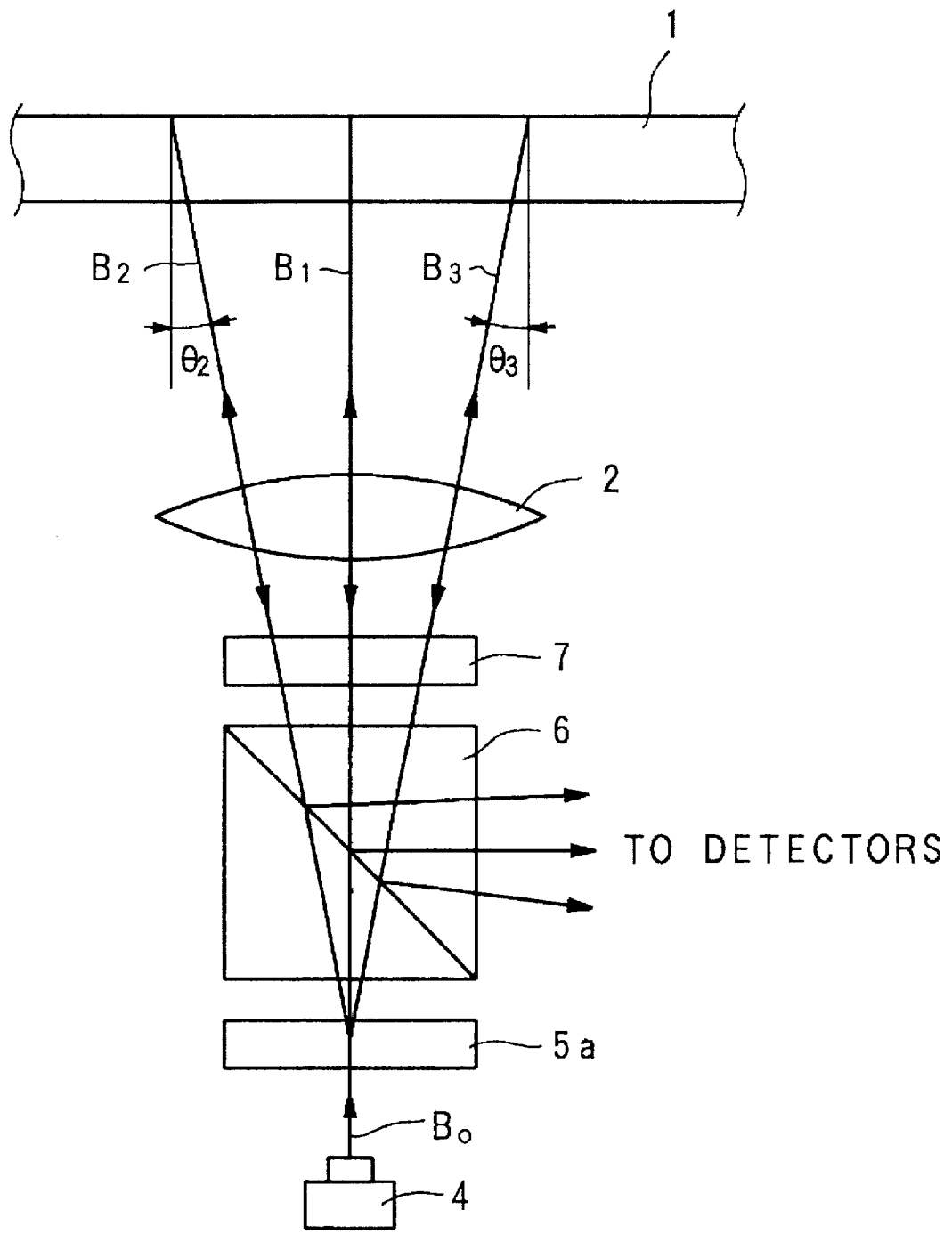
FIG. 10 is a block diagram of a light irradiation optical system in a third embodiment of the present invention.

In the above explained first and second embodiments, a plurality of light beams Bc+ and Bc−, each of which has the coma aberration to cancel or reduce the coma aberration due to the disc skew are generated on the basis of the light beam Bo. In the third embodiment, a plurality of light beams, each of which does not have the coma aberration, are generated by an ordinary grating. The construction of the light irradiation optical system is shown in FIG. 10. In FIG. 10, the constitutional elements same as those in FIG. 4A carry the same reference numerals and the explanation thereof are omitted.

In FIG. 10, the third embodiment is provided with a grating 5a in place of the grating 5 of the first or second embodiment. The grating 5 is constructed to separate the inputted light beam Bo into three light beams $B_1$, $B_2$, and each of which does not have the coma aberration. The light beam $B_1$ is applied onto the information record surface of the optical disc 1 by a right angle. On the other hand, the optical path of the light beam $B_2$ is prescribed by the optical system such that the light beam $B_2$ is applied onto the information record surface of the optical disc 1 obliquely by a predetermined angle $\theta_2$ (which is not equal to a right angle), while the optical path of the light beam $B_3$ is prescribed by the optical system such that the light beam $B_3$ is applied onto the information record surface of the optical disc 1 obliquely by a predetermined angle $\theta_3$ (which is not equal to a right angle, and may be equal to $-\theta_2$) as shown in FIG. 10.

The light detecting system of the third embodiment is the same as the first embodiment shown in FIG. 4A or the second embodiment shown in FIG. 9A. The reflection lights of the light beams $B_1$ to $B_3$ are detected by the photodetectors, and one of the light detection signals originated from the light beams $B_1$ to $B_3$, which is the most suitable to cancel or reduce the coma aberration due to the disc skew of the optical disc 1 is selected in the same manner as in the first and second embodiments.

(V) Fourth Embodiment

Figure 11:
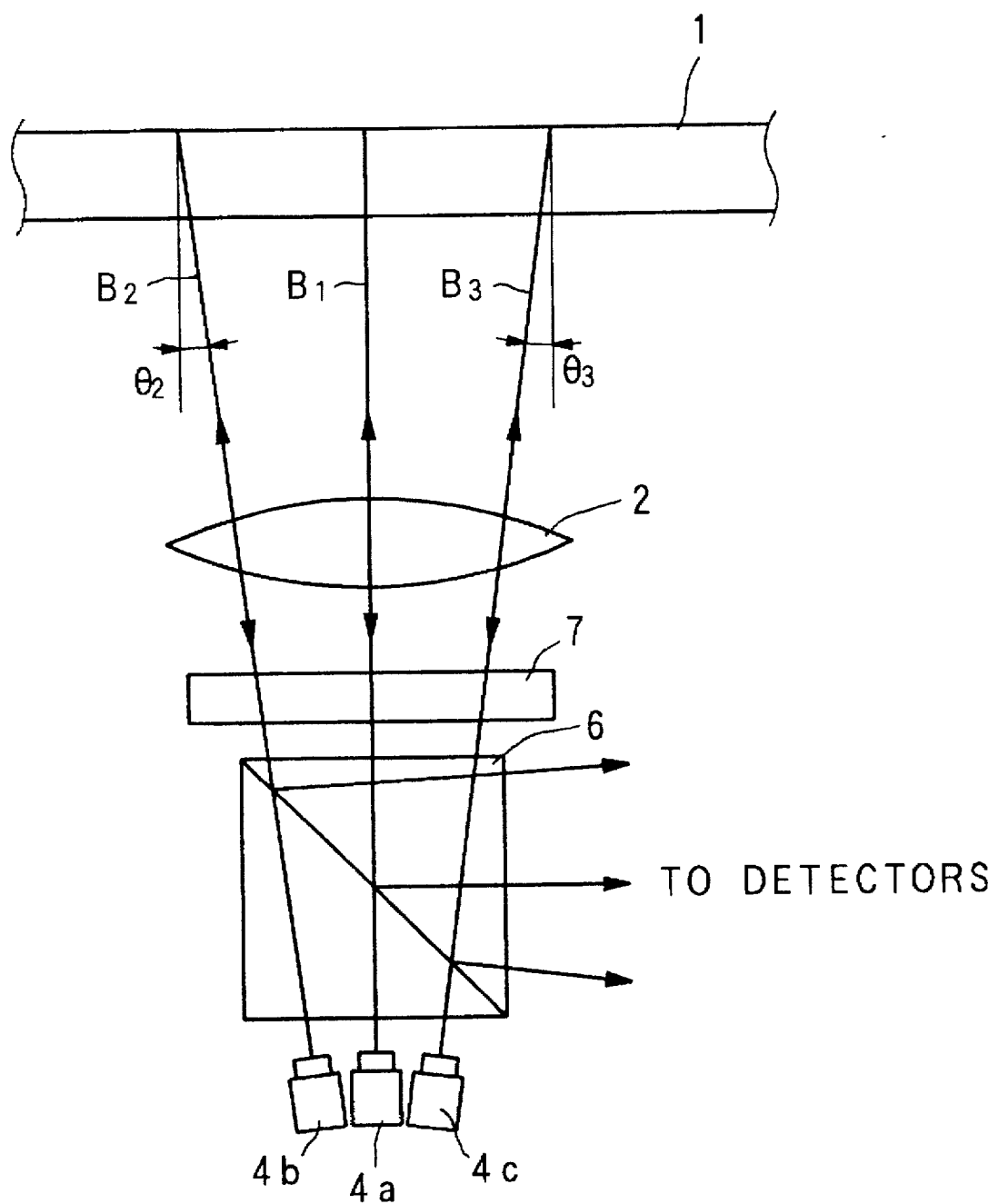
FIG. 11 is a block diagram of a light irradiation optical system in a fourth embodiment of the present invention.

In the above explained first and second embodiments, a plurality of light beams Bc+ and Bc−, each of which has the coma aberration to cancel or reduce the coma aberration due to the disc skew are generated on the basis of the light beam Bo. In the fourth embodiment, a plurality of light beams, each of which does not have the coma aberration, are generated by a plurality of light emitting elements. The construction of the light irradiation optical system is shown in FIG. 11. In FIG. 11, the constitutional elements same as those in FIG. 4A carry the same reference numerals and the explanation thereof are omitted.

In FIG. 11, the fourth embodiment is provided with a plurality of semiconductor lasers 4a, 4b and 4c. The semiconductor lasers 4a, 4b and 4c are arranged to emit three light beams $B_1$, $B_2$, and $B_3$, each of which does not have the coma aberration. The light beam $B_1$ is applied onto the information record surface of the optical disc 1 by a right angle. On the other hand, the optical path of the light beam $B_2$ is prescribed by the optical system such that the light beam $B_2$ is applied onto the information record surface of the optical disc 1 obliquely by a predetermined angle $\theta_2$ (which is not equal to a right angle), while the optical path of the light beam $B_3$ is prescribed by the optical system such that the light beam $B_3$ is applied onto the information record surface of the optical disc 1 obliquely by a predetermined angle $\theta_3$ (which is not equal to a right angle, and may be equal to $-\theta_2$) as shown in FIG. 11.

The light detecting system of the fourth embodiment is the same as the first embodiment shown in FIG. 4A or the second embodiment shown in FIG. 9A. The reflection lights of the light beams $B_1$ to $B_3$ are detected by the photodetectors, and one of the light detection signals originated from the light beams $B_1$ to $B_3$, which is the most suitable to cancel or reduce the coma aberration due to the disc skew of the optical disc 1 is selected in the same manner as in the first to third embodiments.

According to the fourth embodiment, the influence of the coma aberration due to the disc skew can be reduced without the use of a mechanical movable element.

As described above in detail, according to the present embodiments, even if the information record surface of the optical disc is tilted by the aged deterioration, the stress applied by the clamp etc., the influence of this tilt can be efficiently compensated, and the correct and exact reproduction operation can be performed by use of a relatively simple construction. The size of the apparatus can be made small and the production cost of the apparatus can be made low without the use of the mechanical movable element for compensating the tilt.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing apparatus for reproducing information recorded on an information track formed on an information record surface of an optical disc, comprising:

a light irradiation means for irradiating the information record surface with a plurality of light beams including a first light beam, to which a coma aberration is not given, and at least one second light beam, to which a predetermined coma aberration for cancelling a coma aberration due to a tilt of the information record surface in a direction perpendicular to the information track is given, such that the first light beam and the second light beam form light spots arranged along the information track;

a first photo-detector for detecting a first reflection light of the first light beam reflected from the information record surface and generating a first light detection signal indicating the detected first reflection light;

a second photo-detector for detecting a second reflection light of the second light beam reflected from the information record surface and generating a second light detection signal indicating the detected second reflection light;

a tilt detection means for detecting a tilt of the information record surface at an area irradiated with the first and second light beams and outputting a tilt signal indicating the detected tilt;

a selection means for selecting one of the first and second light detection signals which has a less coma aberration according to the tilt signal; and a reproduction process means for reproducing the information on the basis of the selected one of the first and second light detection signals.

2. An apparatus according to claim 1, wherein said light irradiation means gives the predetermined coma aberration, which is directed perpendicular to the information track on the information record surface, to the second light beam.

3. An apparatus according to claim 1, wherein said light irradiation means irradiates the information record surface with two second light beams, to one of which the predetermined coma aberration in one direction perpendicular to the information track on the information record surface is given, and to the other of which the predetermined coma aberration in a direction opposite to said one direction on the information record surface is given.

4. An apparatus according to claim 1, wherein said light irradiation means comprises a light emitting element for emitting a light beam and a light separating means for separating the emitted light beam into the first and second light beams while giving the predetermined coma aberration only to the second light beam.

5. An apparatus according to claim 4, wherein said light separating means comprises a grating.

6. An apparatus according to claim 1, wherein said light irradiation means comprises a plurality of light emitting elements including a first light emitting element for emitting the first light beam and a second light emitting element for emitting the second light beam.

7. An information reproducing apparatus for reproducing information recorded on an information track formed on an information record surface of an optical disc, comprising:

a light irradiation means for irradiating the information record surface with a plurality of light beams including a first light beam, to which a comma aberration is not given and which is applied onto the information record surface perpendicularly, and at least one second light beam, to which a comma aberration is not given and which is applied onto the information record surface obliquely in a direction perpendicular to the information track by a predetermined tilt angle, such that the first light beam and the second light beam form light spots arranged along the information track;

a first photo-detector for detecting a first reflection light of the first light beam reflected from the information record surface and generating a first light detection signal indicating the detected first reflection light;

a second photo-detector for detecting a second reflection light of the second light beam reflected from the information record surface and generating a second light detection signal indicating the detected second reflection light;

a tilt detection means for detecting a tilt of the information record surface at an area irradiated with the first and second light beams and outputting a tilt signal indicating the detected tilt;

a selection means for selecting one of the first and second light detection signals which has a less coma aberration according to the tilt signal; and a reproduction process means for reproducing the information on the basis of the selected one of the first and second light detection signals.

8. An apparatus according to claim 7, wherein said light irradiation means comprises a light emitting element for emitting a light beam and a light separating means for separating the emitted light beam into the first and second light beams.

9. An apparatus according to claim 8, wherein said light separating means comprises a grating.

10. An apparatus according to claim 7, wherein said light irradiation means comprises a plurality of light emitting elements including a first light emitting element for emitting the first light beam and a second light emitting element for emitting the second light beam.

* * * * *